United States Patent [19]

Napolitano et al.

[11] 4,222,198
[45] Sep. 16, 1980

[54] TREE TIE

[76] Inventors: Alex Napolitano; Dennis M. Napolitano, both of 8034 Milliken Ave., Whittier, Calif. 90602

[21] Appl. No.: 914,055

[22] Filed: Jun. 9, 1978

[51] Int. Cl.³ .............................................. A01G 17/10
[52] U.S. Cl. ....................................................... 47/43
[58] Field of Search ................................ 47/42, 43, 44

[56] References Cited

U.S. PATENT DOCUMENTS 1,399,207  12/1921  Goozey .................................. 47/44 X

FOREIGN PATENT DOCUMENTS 166093  12/1905  Fed. Rep. of Germany .............. 47/44
845431  7/1952  Fed. Rep. of Germany .............. 47/44
1213663  1/1964  Fed. Rep. of Germany .............. 47/44

Primary Examiner—Edgar S. Burr
Assistant Examiner—James R. Feyrer
Attorney, Agent, or Firm—Georges A. Maxwell

[57] ABSTRACT

A tree tie engageable about the trunk of a tree and fixed to a supporting post set adjacent the tree. The tree tie is such that it will yield about and freely permit the trunk of its related tree to grow or increase in size and is such that it will yield, buffer and absorb shock-like forces imparted into it upon rapid movement of the tree relative to the post. The tree tie comprises a collar established of a length of rubber or plastic hose engaged about its related tree trunk, a pair of elongate cable or wire lines extending from within the opposite ends of the collar to the support post with which they are secured by anchoring means and helical spring means within and carried by the collar and connected with the ends of the lines within the collar. The spring means operate to normally yieldingly impart tension on the lines whereby the tree is yieldingly prevented from bending and/or tipping in a direction away from the post to an excessive extent. The spring means also operate to support and prevent collapsing of the collar.

5 Claims, 6 Drawing Figures

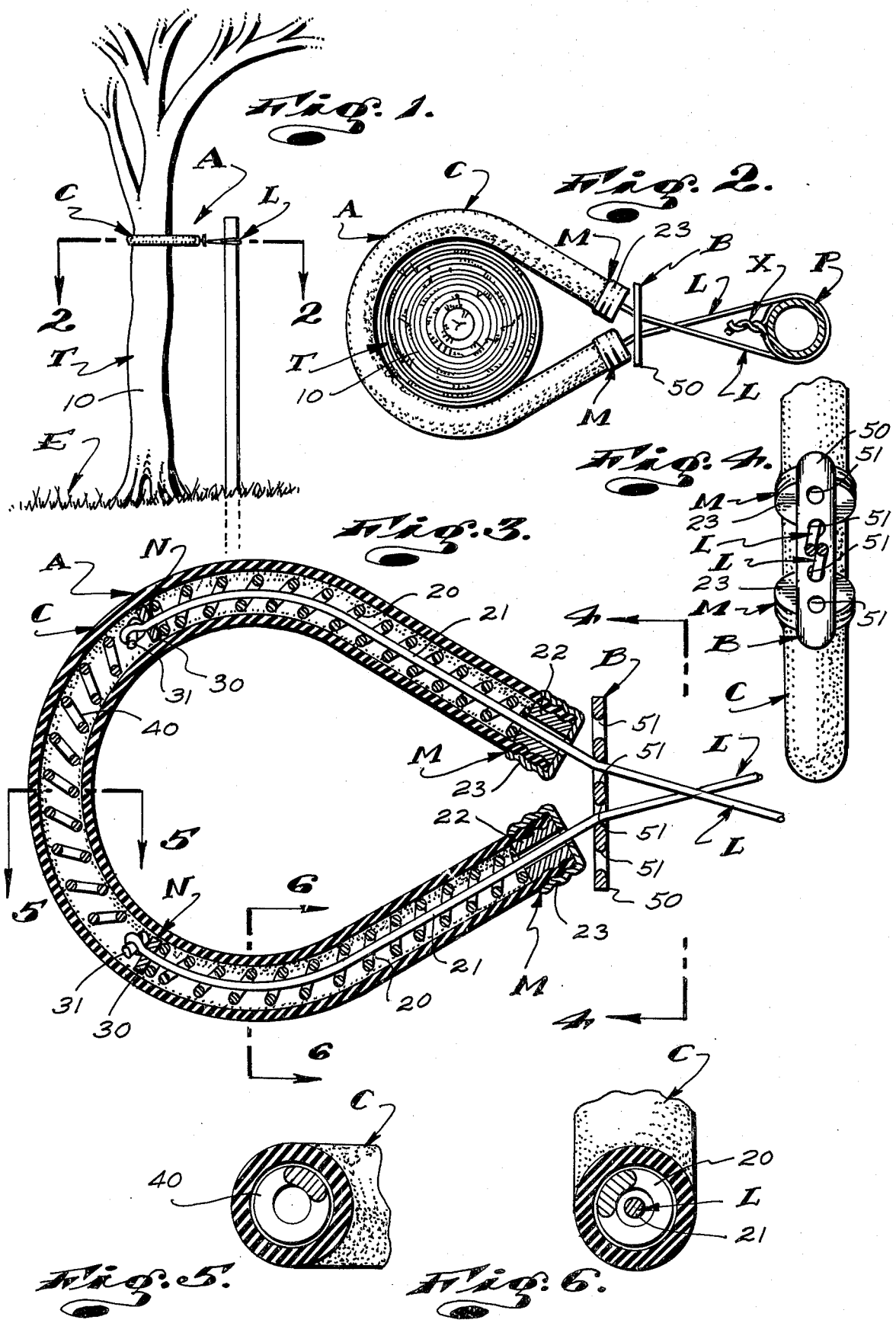

TREE TIE

PRIOR ART

Tree ties provided by the prior art which most closely resemble the tree tie of the present invention and of which we are aware are comprised of length of hose with single lengths of wire engaged therethrough to extend from the opposite ends thereof. The hoses are engaged about the trunks of related trees and the wires are extended to and tied off or secured to support posts set in the soil adjacent the trees.

BACKGROUND OF THE INVENTION

In the growing and care of trees, it is often required and it is common practice to support trees against falling or being blown down and to control their direction of vertical growth. The most common and satisfactory way in which to support trees to attain the above ends is to set elongate vertical, rigid, support posts in the earth adjacent to the trees and to tie the trees to the posts. So as not to damage the trees, the tie means employed to tie the trees to the posts must be such that they will not cut into and damage the trees or abrade the trees upon anticipated relative movement between the trees and the posts.

To the above end, the prior art has found that a most satisfactory tie means or tree tie, is established by a short length of rubber or plastic garden hose engaged about the trunk of a tree to be tied and through which a length of wire or cable is engaged to effect securing the hose in place about the tree and to an adjacent supporting post. The hoses in such tie means prevent the wires of the ties from coming into contact with and cutting into the trees. The hoses are sufficiently large in diameter and sufficiently soft and flexible so that those forces which the tie means impart into the trees are effectively distributed and dispersed so as to prevent damage to the trees.

A principle shortcoming to be found in the above noted form of tree tie and in certain other, less sophisticated forms of ties provided by the prior art, resides in the fact that the tree ties do not provide or allow for growth of the trees and are such that if left engaged about their related trees for any appreciable period of time, they strangulate the trees by constricting and prevent the normal development and function of the cambrium layers of the trees. In those cases where the trees are not killed, the growth and development of the trees is adversely affected in one or more different ways.

In order to prevent tree ties from strangling or otherwise adversely affecting the growth of related trees, it is common and recommended practice to retie the tree at last once a year, prior to the commencement of each growing season. In doing so, the ties are set so as to allow for anticipated growth through the next growing season. Such practices are extremely costly and are subject to being carried out in an improper manner or forgotten.

Another shortcoming to be found in tree ties of the general character referred to above resides in the fact that they are most often, non-yielding in nature and are such that when their related trees are caused to move, bend or yield laterally away from their supporting posts, as by the force of sudden gusts of wind, the trees frequently snap and break at their points or lines of contact with the unyielding tree ties.

In order to overcome the above shortcoming, it is recommended procedure and practice to employ support posts which are not so heavy, strong and durable that they will not yield or fail before the trunks of their related trees will break. That is, good practice requires that the support posts be less strong than the tree trunks so that should the trees have to yield and bend under the forces of gale winds and the like, they will not be prevented from doing so by the tree tie means. As a result of the foregoing, in the case of trees which must be suppoted or tied for many years, it is frequently necessary that the support posts be replaced by larger and stronger posts every year or two, during the development of trees.

The above practice is obviously quite costly and is often neglected.

OBJECTS AND FEATURES OF THE INVENTION

An object of our invention is to provide an improved tree tie which overcomes the principal shortcomings found to exist in tree ties provided by the prior art.

It is an object and feature of the present invention to provide a tree tie structure which is yieldingly expandable whereby it will expand to freely accommodate the trunk of a related tree as the tree grows and so that it cannot strangulate or constrict and adversely affect the growth of the tree.

It is a object and feature of the present invention to provide a tree tie of the general character referred to above which serves to yieldingly support its related tree whereby forces acting upon and through the tree and which tend to bend and cause the tree to move away from the support post are yieldingly countered and effectively buffered whereby the tree is not subject or likely to be broken by such forces at its point or line of contact with the tie means.

It is another object and feature of our invention to provide an improved tree tie means of the general character referred to above which is such that it can be related with a related tree and safely left, unattended, for several years and throughout extended periods during which the size of the tree increases materially.

Another object and feature of the present invention is to provide a tree tie structure of the general character referred to above which includes a vertical support post set adjacent the trunk of a related tree, a large diameter, soft, flexible, resilient tree trunk embracing collar, a pair of elongate lines with outer ends secured to the post and each extending to a related end of said collar and resilient spring means within said collar and connected with said lines to normally yieldingly urge the lines into their related end portions of the collar and to thereby urge said collar about said trunk and toward said post.

Finally, it is an object and feature of our invention to provide a tree tie of the general character referred to in the foregoing which is easy and economical to manufacture; easy and convenient to use; highly effective and dependable in operation; and, which is substantially maintenance-free.

The foregoing and other objects and features of our invention will be apparent from the following detailed description of a typical preferred form and embodiment of my invention, throughout which description reference is made to the accompanying drawings.

DESCRIPTION OF THE DRAWINGS

FIG. 1 shows our tree tie related to a tree;

FIG. 2 is an enlarged view taken substantially as indicated by line 2—2 of FIG. 1;

FIG. 3 is an enlarged detailed sectional view of a portion of the structure shown on FIG. 2;

FIG. 4 is a view taken as indicated by line 4—4 of FIG. 3;

FIG. 5 is an enlarged detailed sectional view taken as indicated by line 5—5 on FIG. 3; and FIG. 6 is an enlarged detailed sectional view taken as indicated by line 6—6 on FIG. 3.

DESCRIPTION OF THE INVENTION

In FIG. 1 of the accompanying drawings, we show our new tree tie structure A related to a tree T.

The tree tie A includes a support post P, a collar C, tie lines L and spring means S. In addition to the foregoing, the structure A includes an adjustable line separator means B.

The post P is a structurally rigid and strong, elongate, vertical post arranged in close substantial parallel relationship with the trunk 10 of the tree T and has a lower end portion engaged and set in the earth E, in accordance with common practice.

The post P is shown established of a length of pipe. In practice, the post can be established of wood, reinforced concrete or any other suitable strong and durable material.

In practice, where the tree T is adjacent or in close proximity to a sound and suitably strong supporting structure, such as a wall, fence or building, the post P can be eliminated and the supporting structure adjacent the tree can be used in its stead.

The collar C is en elongate, soft, flexible, resilient tubular part established of a length of common rubber or plastic garden hose or the like. The collar C is preferably slightly greater in longitudinal extent than the circumference of the tree trunk 10 and is bent or formed in a semi-circular form and in a horizontal plane about the trunk 10 of the tree in desired vertical spaced relationship above the surface of the earth E.

The free ends of the collar C extend and converge toward the upper end portion of the post P.

The tie lines L are lengths of flexible cable or malleable wire. There are two lines L, each of which has an inner end portion extending into a related end portion of the collar C.

In the form of the invention illustrated, the other or outer ends of the lines L are suitably engaged about the post and are tied together so as to fix or anchor the outer ends of the lines with the post, as clearly illustrated at X in FIG. 2 of the drawings.

In practice, the means by which or manner in which the outer ends of the lines L are anchored or secured to their related support post P or other supporting structure can vary widely without departing from the spirit of my invention.

The spring means S that we provide is shown as including two elongate compression springs 20. Each spring 20 is engaged within a related end portion of the tubular collar C for relatively free axial shifting therein. The end portion 21 of each line L extends longitudinally freely through its related spring 20.

The spring means S next includes spring stop means M at and within the terminal ends of the collar C and against which the outer ends of the springs 21 seat and stop. The means M can vary widely in form. In the case illustrated, the means M related to each end of the collar C includes a cylindrical spool like stop 22 engaged in its related outer end portion of the collar and a malleable metal sleeve 23 engaged about the exterior of the end portion of the collar and crimped or swaged radially inwardly whereby the stop 22 is fixedly held within the collar C.

The stops 22 of the means M have central openings through which the inner end portions of their related lines L freely extend.

In practice, the means M have been effectively established with parts of common commercially available crimped and/or swaged garden hose coupling structures.

Finally, the spring means S that we provide includes spring follower means at the inner ends of the lines L and establishing axial driving engagement with the inner ends of their related springs 20. In the case illustrated, the means N related to each line L and spring 20 includes a metal washer 30 seated on the inner end of the spring 20. The line L extends through the washer 30 and is suitably coupled therewith to prevent its separation therefrom. In the case illustrated, the lines L and washers 30 are coupled by simply knotting the inner ends of the lines L, inward of the washers, as shown at 31.

In practice, the washers 30 can be retained on the lines or can be replaced by metal sleeves engaged and crimped on and about the lines or the washers can be replaced by spools through which the lines extend and which carry set screws to fix the spools and lines together, without departing from the spirit of this invention.

It will be apparent that with the structure thus far described, when the lines L are under tension, the tensile forces are transmitted onto and through the spring means, compressing the springs and increasing the amount or portions of the lines L which extend from the ends of the collar C.

It is to be noted that the springs 20 serve the additional function of supporting and preventing the tubular collar C from collapsing when drawn taut about its related tree trunk 10.

In practice, the springs 20 can be equal to about one-third the length of the collar C. In such a case and so as to support and prevent collapsing of the portion of the collar between the springs 20, we provide an elongate helical support spring 40, as clearly shown in FIGS. 3 and 5 of the drawings.

The line separating means B that we provide comprises a plate 50 with a plurality of spaced openings 51 through which the lines L are selectively engaged. The plate 50 is arranged to occur on the lines L adjacent the ends of the collar C. The space between the selected pair of openings 51 through which the lines L extend determines the angle of the lines between the collar and the plate and the resulting effective diametric extent of the collar C when the construction is in use. If the openings 51 through which the lines L extend are spaced close together, the collar C is drawn into a small or tight loop for effective engagement about a small diameter tree trunk. If the openings 51 through which the lines L extend are spaced a substantial distance apart, the collar establishes a larger diameter loop for effective engagement about a larger tree trunk.

In use, when our tree tie structure A is related to a tree, as shown throughout the drawings, the collar C will readily yieldingly expand as the tree trunk 10 grows larger and will not tend to cut into, abrade or otherwise do harm to the tree trunk.

Further, when and if the tree T is forced and caused to move rapidly relative to the post and in a manner so the forces exerted by the tree tie structure onto the tree are materially increased, the spring means S will yield under such increased forces in such a manner as to buffer said forces and inhibit their reaching such high concentrations as is likely to cause damage to the tree and/or to the tree tie structure.

It is to be particularly noted that the two springs 20 of the spring means S establishes a balanced structure which is such that when forces which are sufficient to compress and cause working of the springs are encountered, both lines L move axially relative to the collar and the collar C remains stationary relative to the tree. As a result of the foregoing, the collar C remains in fixed position about its related tree trunk 10 and will not rotate, turn, or move about the tree trunk in such a manner as might abrade the tree trunk and/or cause the collar to wear.

Having described only one typical preferred form and embodiment of our invention, we do not wish to be limited to the specific details herein set forth but wish to reserve to ourselves any modifications and/or variations that may appear to those skilled in the art and which fall within the scope of the following claims.

Having described my invention, we claim:

1. A tree tie comprising a fixed support structure in lateral spaced relationship with a tree trunk, an elongate tubular flexible collar yieldingly engaged about said trunk with its opposite end portions extending and converging laterally from the trunk toward said support structure; a pair of elongate flexible tie lines having inner end portions extending into related end portions of the collar and having outer end portions extending from the collar to said support structure; anchoring means securing the outer end portions of the lines to the support structure; elongate helical compression springs with inner and outer ends and positioned within the end portions of the collar; spring stops fixed at the ends of the collars and engaging the outer ends of the springs related thereto; and coupling means at the inner ends of the tie lines coupling the inner ends of the lines with the inner ends of their related springs, said springs normally yieldingly urging the inner ends of the lines longitudinally inwardly in their related ends of the collar and the opposite ends of the collar toward said support structure.

2. The tree tie set forth in claim 1 wherein an elongate helical collar support spring is engaged in and extends longitudinally through the collar between the compression springs.

3. The tree tie set forth in claim 2 wherein the opposite ends of the support spring are integrally joined with the inner ends of their related compression springs, said support spring is tensioned when the compression springs are compressed.

4. The tree time set forth in claim 1 which further includes a line guide with spaced openings through which said lines extend and positioned adjacent the ends of the collar to direct the lines and set the diameter of the collar.

5. A tree tie set forth in claim 1 wherein the inner end portions of the tie lines extend longitudinally freely through said spring stops and springs; said coupling means include followers fixed to the inner ends of the tie lines and extend radially from the lines within the collar and engage the inner ends of their related compression spring.

* * * * *